(12) United States Patent
Noda

(10) Patent No.: US 8,154,267 B2
(45) Date of Patent: Apr. 10, 2012

(54) CURRENT MODE CONTROL TYPE SWITCHING REGULATOR

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 369 days.

(21) Appl. No.: 12/595,069

(22) PCT Filed: Feb. 4, 2009

(86) PCT No.: PCT/JP2009/052257
§ 371 (c)(1),
(2), (4) Date: Oct. 8, 2009

(87) PCT Pub. No.: WO2009/110289
PCT Pub. Date: Sep. 11, 2009

(65) Prior Publication Data
US 2010/0066333 A1   Mar. 18, 2010

(30) Foreign Application Priority Data
Mar. 7, 2008   (JP) .................................. 2008-057414

(51) Int. Cl.
*G05F 1/40* (2006.01)
(52) U.S. Cl. .......................... 323/285; 323/284; 323/288
(58) Field of Classification Search .................. 323/222, 323/225, 282–290
See application file for complete search history.

(56) References Cited

U.S. PATENT DOCUMENTS

| | | | | | |
|---|---|---|---|---|---|
| 6,828,766 | B2 * | 12/2004 | Corva et al. | .................... | 323/284 |
| 7,245,113 | B2 * | 7/2007 | Chen et al. | .................... | 323/271 |
| 7,615,973 | B2 * | 11/2009 | Uehara | ......................... | 323/224 |
| 7,750,617 | B2 * | 7/2010 | Omi | ............................... | 323/285 |
| 7,777,472 | B2 * | 8/2010 | Uehara | ......................... | 323/284 |
| 2003/0231012 | A1 * | 12/2003 | Corva et al. | ................... | 323/285 |
| 2005/0258997 | A1 | 11/2005 | Kim et al. | | |
| 2007/0182392 | A1 | 8/2007 | Nishida | | |
| 2007/0285073 | A1 | 12/2007 | Nishida | | |
| 2008/0157738 | A1 | 7/2008 | Nishida | | |

FOREIGN PATENT DOCUMENTS

| | | |
|---|---|---|
| JP | 63-99611 | 4/1988 |
| JP | 2-73826 | 6/1990 |
| JP | 2-260914 | 10/1990 |
| JP | 5-267965 | 10/1993 |
| JP | 2005-333635 | 12/2005 |
| JP | 2006-34033 | 2/2006 |
| JP | 2006-121845 | 5/2006 |
| JP | 2006-246626 | 9/2006 |
| JP | 2007-82347 | 3/2007 |
| JP | 2007-110833 | 4/2007 |

(Continued)

*Primary Examiner* — Jessica Han
(74) *Attorney, Agent, or Firm* — Cooper & Dunham LLP

(57) ABSTRACT

A switching regulator for converting input voltage to output voltage includes a switch; an inductor energized by input voltage by the switch; a rectifier for discharging the inductor; and a slope voltage generator for generating slope voltage inclined responsive to current of the inductor, amplifies a difference between reference voltage and divided output voltage, and compares the amplified voltage and the slope voltage to generate signal for controlling the switch. The slope voltage generator includes a detector for converting current flowing through the inductor when the switch is on into voltage; and a voltage generator for generating ramp voltage. These voltages are added as the slope voltage. The voltage generator includes constant current; a resistor; and a ramp capacitor charged by the constant current through the resistor. Voltage drop of the resistor is added to terminal voltage of the ramp capacitor to output the ramp voltage.

2 Claims, 6 Drawing Sheets

FOREIGN PATENT DOCUMENTS

| | | |
|---|---|---|
| JP | 2007-202273 | 8/2007 |
| JP | 2007-202281 | 8/2007 |
| JP | 2007-209103 | 8/2007 |
| JP | 2007-209135 | 8/2007 |
| JP | 2007-209180 | 8/2007 |
| JP | 2007-241411 | 9/2007 |
| JP | 2007-252137 | 9/2007 |
| JP | 2008-72786 | 3/2008 |
| JP | 2008-72833 | 3/2008 |
| JP | 2008-72835 | 3/2008 |
| JP | 2008-131746 | 6/2008 |
| JP | 2008-131747 | 6/2008 |
| JP | 2008-178263 | 7/2008 |
| JP | 2008-206366 | 9/2008 |
| JP | 2008-228514 | 9/2008 |

* cited by examiner

CURRENT MODE CONTROL TYPE SWITCHING REGULATOR

TECHNICAL FIELD

The present invention relates to a current mode control type switching regulator, in particular to a switching regulator capable of stable operation even when there is a large difference between an input voltage and an output voltage.

BACKGROUND ART

FIG. 5 is a diagram depicting an example of a slope voltage generating circuit in a conventional current mode control type switching regulator (for example, see Patent Document 1). In the current mode control type switching regulator, an inductor current iL flowing through an inductor when a switching transistor is on is the same as a drain current of the switching transistor. When on-resistance of the switching transistor is known, the inductor current iL can be detected by detecting a voltage drop caused by the switching transistor.

In view of this, an inductor current detecting circuit 110a detects a voltage drop caused when the switching transistor is on. When the switching transistor is on, a gate signal S101 supplied to the switching transistor is at a low level. At this time, a PMOS transistor M113 is turned on at the same time as a PMOS transistor M112 is turned off. Therefore, a voltage VLx of a node Lx between the switching transistor and the inductor is inputted to a non-inverting input terminal of an operational amplifier circuit 111.

The operational amplifier circuit 111 controls a gate voltage of a PMOS transistor M111 so that a source voltage of the PMOS transistor M111 becomes the same voltage level as the voltage VLx. Therefore, a drain current of the PMOS transistor M111 is proportional to the inductor current iL. The drain current is converted into a voltage VA by a resistor R112. The voltage VA is outputted through a resistor R113. When the resistors R111 and R112 have the same resistance values, the source voltage VA of the PMOS transistor M111 is expressed by a formula (a) below.

$$VA = Vin - VLx \quad (a)$$

Further, when the switching transistor is off, the gate signal S101 is at a high level. In this case, the PMOS transistor M113 is turned off at the same time as the PMOS transistor M112 is turned on. Therefore, an input voltage Vin is inputted to the non-inverting input terminal of the operational amplifier circuit 111. Since the operational amplifier circuit 111 turns off the PMOS transistor M111, the source voltage VA of the PMOS transistor becomes 0 V. An NMOS transistor M114 of a ramp voltage generating circuit 110b is on and conductive during a period when the gate signal S101 is at a high level. Therefore, a current i113 outputted from the constant current circuit 113 is bypassed to the NMOS transistor M114. As a result, a terminal voltage VB of a ramp capacitor C111 is 0 V.

Subsequently, when the gate signal S101 is at a low level, the NMOS transistor M114 is turned off and nonconductive. Therefore, the ramp capacitor C111 is charged by the output current i113 of the constant current circuit 113. A terminal voltage VB of the ramp capacitor C111 is linearly increased to generate a ramp voltage. The ramp voltage VB is outputted through a resistor R114. Output voltages of the inductor current detecting circuit 110a and the ramp voltage generating circuit 110b are added by the resistors R113 and R114 and outputted from a node between the resistors R113 and R114. The resistors R113 and R114 have the same resistance values.

When a voltage of the node between the resistors R113 and R114 is VC, the voltage VC is expressed by a formula (b) below.

$$VC = (VA + VB)/2 = (Vin - VLx + VB)/2 \quad (b)$$

The voltage VC in the above formula (b) is inputted to a non-inverting input terminal of an operational amplifier circuit 114 in an offset voltage generating circuit 110c. The operational amplifier circuit 114 controls a gate voltage of an NMOS transistor M116 so that a source voltage of the NMOS transistor M116 becomes the same voltage level as the voltage VC. As a result, a drain current of the NMOS transistor M116 is proportional to the voltage VC. The drain current is supplied to a resistor R117 through a current mirror circuit formed of PMOS transistors M117 and M118. The drain current is converted into a voltage by the resistor R117 to be an output voltage Vslp of the slope voltage generating circuit 110.

However, the resistor R117 also receives a current supply from a constant current circuit 115 in addition to the output current of the current mirror circuit. Therefore, an offset voltage (r117×i115) corresponding to a voltage obtained by multiplying an output current i115 of the constant current circuit 115 with a resistance value r117 of the resistor R117 is added to the output voltage Vslp of the slope voltage generating circuit 110. In the case where the resistors R116 and R117 have the same resistance values and the resistance value of the resistor R117 is r117, the output voltage Vslp of the slope voltage generating circuit 110 is expressed by a formula (c) below.

$$Vslp = VC + (r117 \times i115)$$
$$= (Vin - VLx + VB)/2 + (r117 \times i115) \quad (c)$$

Note that (r117×i115) in the formula (c) indicates the offset voltage.

Patent Document 1: Japanese Laid-Open Patent Application No. 2006-246626

However, poor linearity in a rising part of the slope voltage Vslp has been a problem in the slope voltage generating circuit 110 shown in FIG. 5. FIG. 6 is a diagram showing a waveform example of the slope voltage Vslp generated by the slope voltage generating circuit 110. As shown in FIG. 6, the slope voltage Vslp rises gently right after the gate signal S101 becomes a low level, and the inclination gradually approaches a proper inclination over time. When a time Tdel passes after the gate signal S101 becomes a low level, the slope voltage Vslp rises with the proper inclination.

The slope voltage Vslp rises gently due to a delay time caused when the voltage VC is converted into a current by a voltage-current converter circuit of the operational amplifier circuit 114 and a delay time caused by the current mirror circuit formed of the PMOS transistors M117 and M118. When the slope voltage Vslp rises gently, the operation of the switching regulator becomes unstable in such cases where there is a large difference between the input voltage Vin and an output voltage Vo of the switching regulator, in which case an on-time of the switching transistor becomes shorter than the time Tdel. As a result, a defect may be caused in that the output voltage Vo becomes unstable, and the like.

DISCLOSURE OF INVENTION

It is an object of at least one embodiment of the present invention to provide a current mode control type switching regulator capable of generating a slope voltage having favorable linearity and of stable operation, that substantially obviate one or more of the above-described problems.

According to one aspect of the present invention, a current mode control type switching regulator for converting an input voltage into an output voltage that is a predetermined constant voltage is provided. The current mode control type switching regulator includes a switching element; an inductor energized by the input voltage in response to switching of the switching element; a rectifier element for discharging the inductor; and a slope voltage generating circuit unit configured to generate and output a slope voltage having an inclination responsive to a current flowing through the inductor. The current mode control type switching regulator is configured to amplify a voltage difference between a predetermined reference voltage and a divided voltage obtained by dividing the output voltage; compare the amplified voltage and the slope voltage to generate a pulsed signal having a duty cycle determined by the comparison; and control switching of the switching element in response to the pulsed signal. The slope voltage generating circuit unit includes an inductor current detecting circuit for detecting a current flowing through the inductor when the switching element is on to energize the inductor and converting the detected current into a voltage; and a ramp voltage generating circuit for generating and outputting a ramp voltage having a predetermined inclination. The slope voltage generating circuit unit is configured to add the voltage obtained by the inductor current detecting circuit and the ramp voltage to generate the slope voltage. The ramp voltage generating circuit includes a constant current circuit for generating and outputting a predetermined constant current; an offset voltage generating resistor through which the constant current outputted by the constant current circuit flows; and a ramp capacitor charged by the constant current outputted by the constant current circuit through the offset voltage generating resistor, said ramp voltage generating circuit being configured to add a voltage drop caused by the offset voltage generating resistor to a terminal voltage of the ramp capacitor to generate and output the ramp voltage.

DESCRIPTION OF EMBODIMENTS

The present invention is described in detail based on an embodiment of the present invention with reference to the drawings.

First Embodiment

Figure 1:
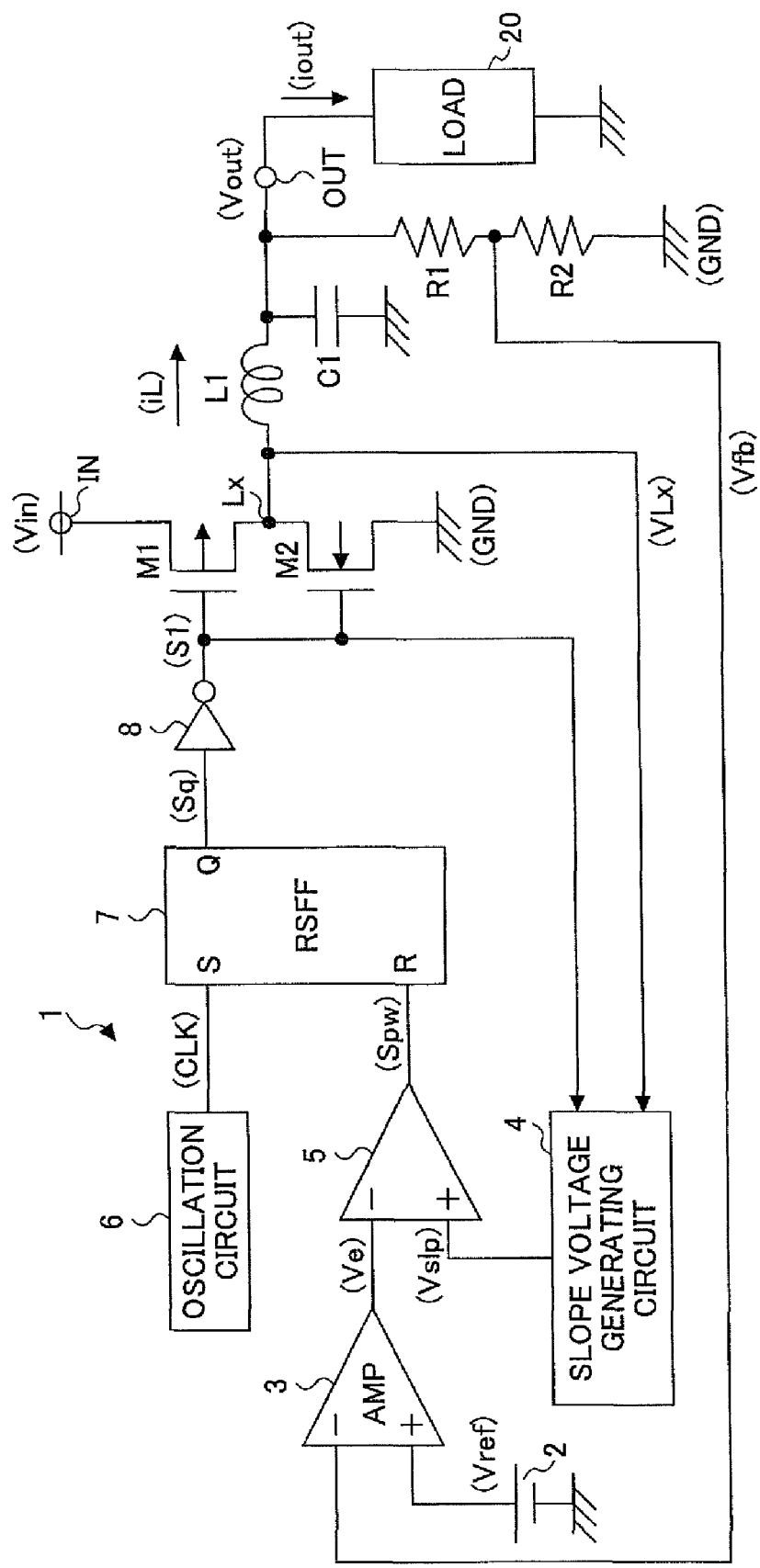
FIG. 1 is a diagram showing a circuit example of a current mode control type switching regulator of a first embodiment of the present invention.

FIG. 1 is a diagram showing a circuit example of a current mode control type switching regulator of a first embodiment of the present invention. In FIG. 1, the current mode control type switching regulator (hereinafter called a switching regulator) 1 serves as a synchronous rectification step-down switching regulator, which steps down an input voltage Vin inputted to an input terminal IN to a predetermined constant voltage to output the constant voltage as an output voltage Vout from an output terminal OUT to a load 20.

The switching regulator 1 includes a switching transistor M1 formed of a PMOS transistor that controls an output of a current supplied from the input terminal IN; a synchronous rectifier transistor M2 formed of an NMOS transistor; an inductor L1, a smoothing capacitor C1; and resistors R1 and R2 for detecting an output voltage, that divide the output voltage Vout to generate and output a divided voltage Vfb. Further, the switching regulator 1 includes a reference voltage generating circuit 2 that generates and outputs a predetermined reference voltage Vref; an error amplifier circuit 3 that compares the divided voltage Vfb and the reference voltage Vref and amplifies a voltage difference to generate and output an error voltage Ve; and a slope voltage generating circuit 4 that generates and outputs a slope voltage Vslp.

Moreover, the switching regulator 1 includes a PWM comparator 5 that compares the error voltage Ve outputted by the error amplifier circuit 3 and the slope voltage Vslp to generate and output a pulsed signal Spw for performing PWM (Pulse Width Modulation) control. The pulsed signal Spw has a pulse width that corresponds to the error voltage Ve. The switching regulator 1 further includes an oscillation circuit 6 that generates and outputs a predetermined clock signal CLK; an RS flip-flop circuit 7 having a set input terminal S receiving the clock signal CLK outputted by the oscillation circuit 6 and a reset input terminal R receiving the pulsed signal Spw outputted by the PWM comparator 5; and an inverter 8 that generates a control signal S1 for controlling switching of the switching transistor M1 and the synchronous rectifier transistor M2 in response to an output signal Sq outputted by the RS flip-flop circuit 7 to drive the switching transistor M1 and the synchronous rectifier transistor M2.

Note that the switching transistor M1 serves as a switching element; the synchronous rectifier transistor M2 serves as a rectifier element; and the slope voltage generating circuit 4 serves as a slope voltage generating circuit unit. Further, in the switching regulator 1 shown in FIG. 1, circuits other than the inductor L1 and the smoothing capacitor C1 may be integrated into one IC.

The switching transistor M1 is connected between the input voltage Vin and a drain of the synchronous rectifier transistor M2. A source of the synchronous rectifier transistor M2 is connected to a ground voltage GND. The inductor L1 is connected between a drain of the switching transistor M1 and the output terminal OUT. The capacitor C1 and a serial circuit of the resistors R1 and R2 are connected in parallel between the output terminal OUT and the ground voltage GND. The divided voltage Vfb, being a voltage at a node between the resistors R1 and R2, is inputted to an inverting input terminal of the error amplifier circuit 3. The reference voltage Vref is inputted to a non-inverting input terminal of the error amplifier circuit 3.

Further, the PWM comparator 5 has an inverting input terminal that receives the error voltage Ve outputted by the error amplifier circuit 3, and a non-inverting input terminal that receives the slope voltage Vslp. The output signal Sq of the RS flip-flop circuit 7 is inverted in level by the inverter 8 and inputted to each gate of the switching transistor M1 and the synchronous rectifier transistor M2, and also to the slope voltage generating circuit 4. A voltage VLx of a node Lx between the switching transistor M1 and the synchronous rectifier transistor M2 is inputted to the slope voltage generating circuit 4.

Figure 2:
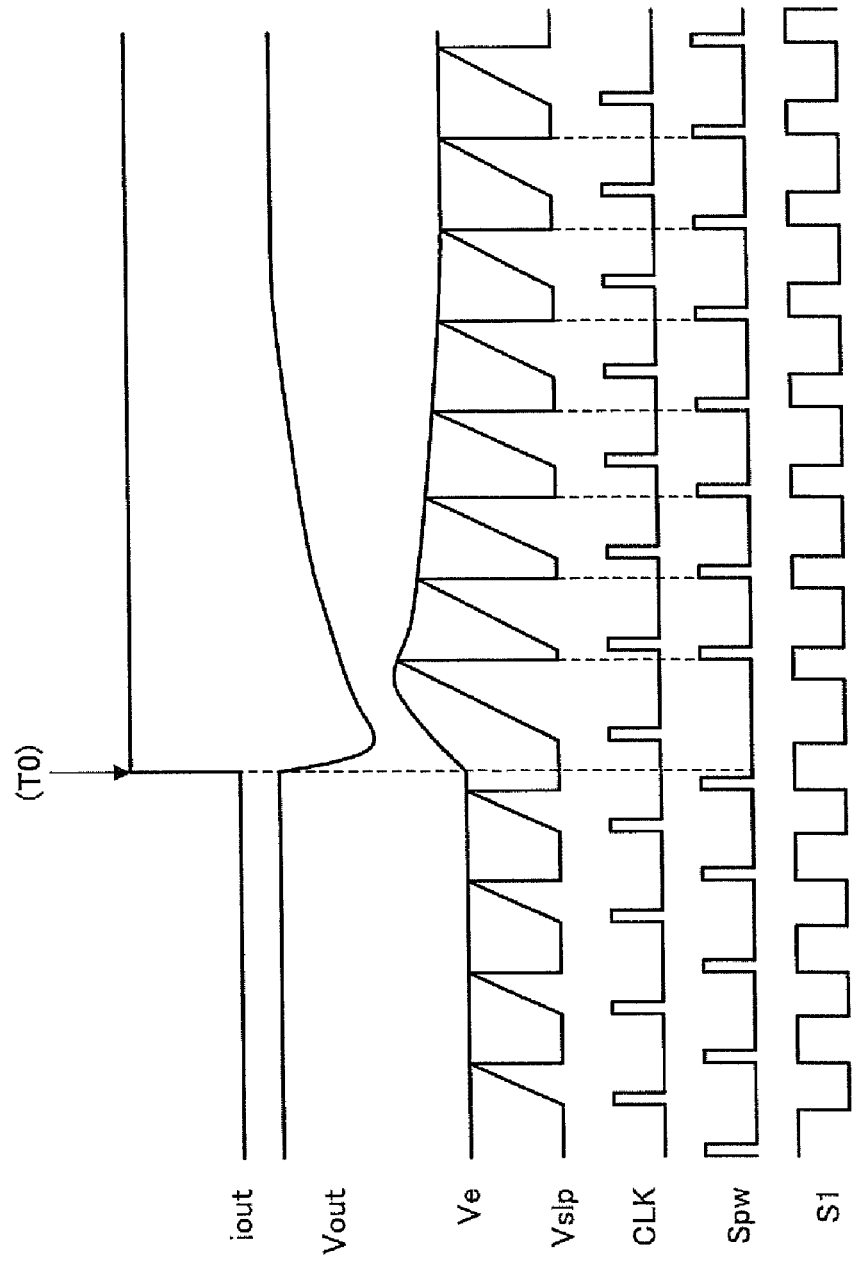
FIG. 2 is a timing chart showing a waveform example of each signal in the switching regulator 1 shown in FIG. 1.

Next, an operation of the switching regulator 1 is described. FIG. 2 is a timing chart showing a waveform example of each signal in the switching regulator 1 shown in FIG. 1. Note that iout denotes an output current outputted from the output terminal OUT to the load 20. The clock signal CLK which becomes a high level on a predetermined cycle is inputted from the oscillation circuit 6 to the set input terminal S of the RS flip-flop circuit 7. When the clock signal CLK becomes a high level, the output signal Sq of the RS flip-flop circuit 7 becomes a high level. Therefore, the control signal S1 at a low level is inputted to each gate of the switching transistor M1 and the synchronous rectifier transistor M2. As a result, the switching transistor M1 is turned on to be conductive while the synchronous rectifier transistor M2 is turned off to be nonconductive. In this case, the input voltage Vin is applied to a serial circuit formed of the inductor L1 and the smoothing capacitor C1. An inductor current iL flowing through the inductor L1 increases linearly over time. When the inductor current iL becomes larger than the output current iout, the smoothing capacitor C1 is charged and the output voltage Vout rises.

The slope voltage generating circuit 4 detects the inductor current iL and converts the inductor current iL into a voltage, and at the same time generates a compensation voltage to prevent subharmonic oscillation. Moreover, the slope voltage generating circuit 4 adds the compensation voltage to the voltage obtained by converting the inductor current iL to generate and output the slope voltage Vslp. The slope voltage Vslp linearly rises during a period when the switching transistor M1 is on. The error amplifier circuit 3, on the other hand, amplifies a voltage difference between the divided voltage Vfb and the reference voltage Vref to generate and output the error voltage Ve. The PWM comparator 5 compares the error voltage Ve and the slope voltage Vslp. The PWM comparator 5 outputs a signal Spw at a high level when the slope voltage Vslp becomes higher than the error voltage Ve to reset the RS flip-flop circuit 7. As a result, the output signal Sq of the RS flip-flop circuit 7 becomes a low level and the control signal S1 becomes a high level. Therefore, the switching transistor M1 is turned off to be nonconductive. At the same time, the synchronous rectifier transistor M2 is turned on to be conductive.

When the switching transistor M1 is turned off and the synchronous rectifier transistor M2 is turned on, the electric energy in the inductor L1 is discharged. When the inductor is energized, electric energy is accumulated in the inductor. In response to this discharging operation, the inductor current iL linearly decreases over time. When the inductor current iL becomes smaller than the output current iout, a power is supplied from the smoothing capacitor C1 to the load 20, which decreases the output voltage Vout. After one cycle of the clock signal CLK outputted by the oscillation circuit 6, the clock signal CLK becomes a high level again. As a result, the switching transistor M1 is turned on and the synchronous rectifier transistor M2 is turned off. Consequently, the inductor current iL flows and the output voltage Vout rises.

Here, when the output current iout is increased at a time T0, the output voltage Vout is decreased and the error voltage Ve outputted by the error amplifier circuit 3 rises. Therefore, it takes longer for the slope voltage Vslp to be higher than the voltage level of the error voltage Ve. As a result, an on-time of the switching transistor M1 becomes longer, which makes a time to supply the power to the inductor L1 longer. Thus, the output voltage Vout rises. When the output voltage Vout rises, on the other hand, the on-time of the switching transistor M1 becomes shorter to decrease the output voltage Vout. In this manner, by controlling the time to turn on/off the switching transistor M1 and the synchronous rectifier transistor M2 in a complimentary manner in response to a change of the output voltage Vout, the output voltage Vout is stabilized.

Figure 3:
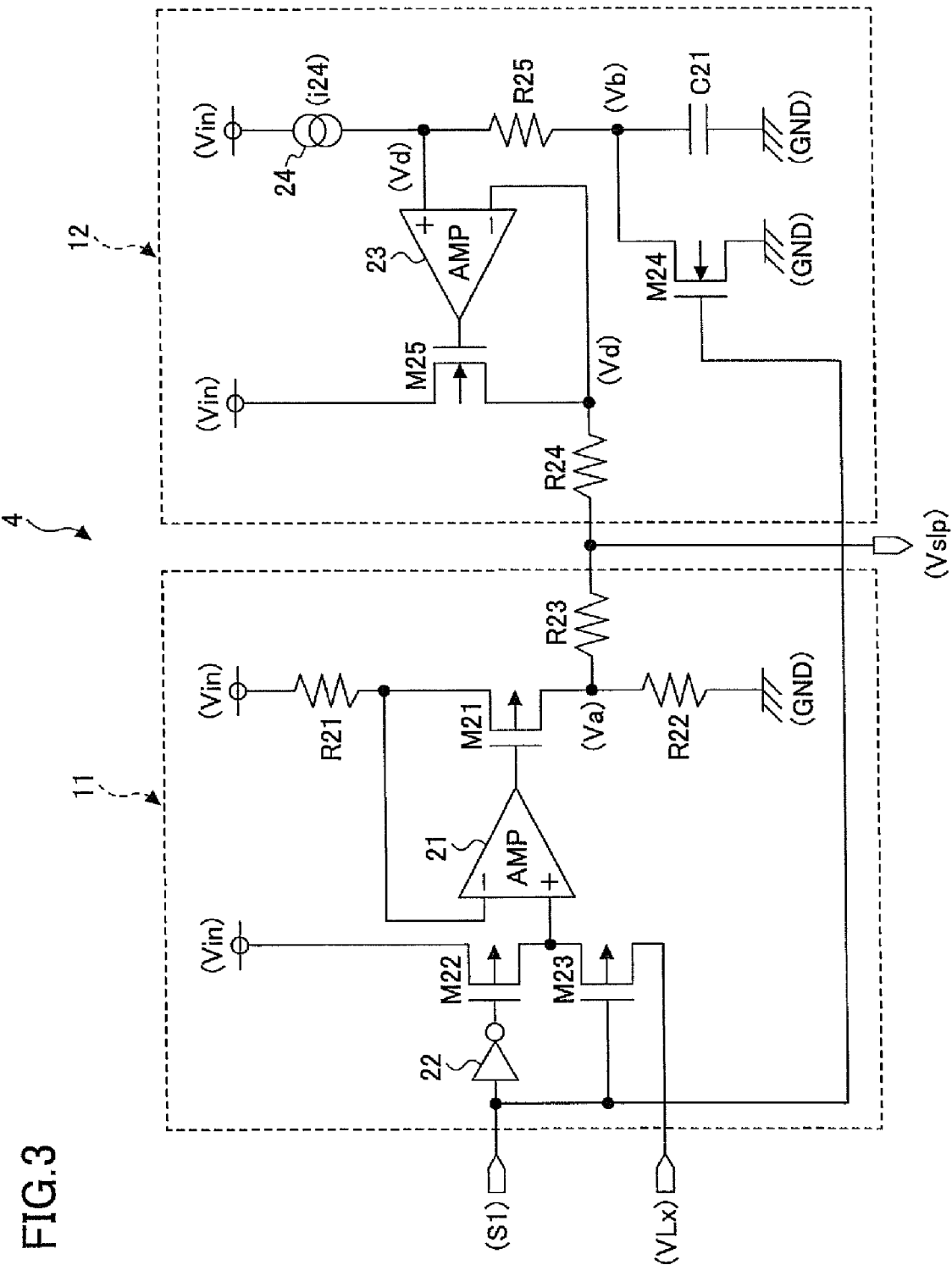
FIG. 3 is a diagram showing a circuit example of a slope voltage generating circuit 4 of FIG. 4.

Next, FIG. 3 is a diagram showing a circuit example of the slope voltage generating circuit 4 shown in FIG. 1. In FIG. 3, the slope voltage generating circuit 4 is formed of an inductor current detecting circuit 11 and a ramp voltage generating circuit 12. The inductor current detecting circuit 11 is formed of an operational amplifier circuit 21, PMOS transistors M21 to M23, an inverter 22, and resistors R21 to R23. The ramp voltage generating circuit 12 is formed of an operational amplifier circuit 23, NMOS transistors M24 and M25, a constant current circuit 24, a ramp capacitor C21, and resistors R24 and R25. Note that the resistor R25 serves as an offset voltage generating resistor. The operational amplifier circuit 23, the NMOS transistor M25, and the resistor R24 serve as an impedance converter circuit.

In the inductor current detecting circuit 11, the PMOS transistor M22 has a source connected to an input voltage Vin and a drain connected to a non-inverting input terminal of the operational amplifier circuit 21. Further, the PMOS transistor M22 has a gate connected to an output terminal of the inverter 22. An input terminal of the inverter 22 receives the control signal S1. The PMOS transistor M23 has a source connected to the non-inverting input terminal of the operational amplifier circuit 21, a drain connected to the node Lx, and a gate receiving the control signal S1.

The resistor R21 is connected between the input voltage Vin and the source of the PMOS transistor M21. An inverting input terminal of the operational amplifier circuit 21 is connected to a source of the PMOS transistor M21. Further, an output terminal of the operational amplifier circuit 21 is connected to a gate of the PMOS transistor M21. The resistor R22 is connected between a drain of the PMOS transistor M21 and a ground voltage GND. One terminal of the resistor R23 is connected to a node between the PMOS transistor M21 and the resistor R22. The other terminal of the resistor R23 serves as an output terminal of the inductor current detecting circuit 11.

In the ramp voltage generating circuit 12, the constant current circuit 24 is connected between the input voltage Vin and the non-inverting input terminal of the operational amplifier circuit 23. The resistor R25 and the ramp capacitor C21 are connected in serial between the non-inverting input terminal of the operational amplifier circuit 23 and the ground voltage GND. The NMOS transistor M24 is connected in parallel to the ramp capacitor C21. A gate of the NMOS transistor M24 receives the control signal S1. Further, the NMOS transistor M25 is connected between the input voltage Vin and the inverting input terminal of the operational amplifier circuit 23. A gate of the NMOS transistor M25 is connected to an output terminal of the operational amplifier circuit 23. One terminal of the resistor R24 is connected to an inverting input terminal of the operational amplifier circuit 23. The other terminal of the resistor R24 serves as an output terminal of the ramp voltage generating circuit 12. The other terminal of the resistor R23, serving as the output terminal of the inductor current detecting circuit 11, and the other terminal of the resistor R24, serving as the output terminal of the ramp voltage generating circuit 12, are connected to each other. A node between the resistors R23 and R24 serves as an output terminal of the slope voltage generating circuit 4, which outputs the slope voltage Vslp.

Here, the inductor current iL which flows through the inductor L1 when the switching transistor M1 is on equals to a drain current of the switching transistor M1. Therefore, when on-resistance of the switching transistor M1 is known, the inductor current iL can be detected by detecting a voltage drop caused by the switching transistor M1. The inductor current detecting circuit 11 detects a voltage drop caused by the switching transistor M1 when the switching transistor M1 is on. When the switching transistor M1 is on, the control signal S1 is at a low level. In this case, the PMOS transistor M22 is off and nonconductive while the PMOS transistor M23 is on and conductive. Therefore, the voltage VLx of the node Lx is inputted to the non-inverting input terminal of the operational amplifier circuit 21.

The operational amplifier circuit 21 controls a gate voltage of the PMOS transistor M21 so that a source voltage of the PMOS transistor M21 becomes the same voltage level as the voltage VLx. Therefore, a drain current of the PMOS transistor M21 becomes proportional to the inductor current iL. The drain current of the PMOS transistor M21 is supplied to the resistor R22 and converted into a voltage by the resistor R22. The converted voltage is outputted through the resistor R23. If the resistors R21 and R22 have the same resistance values, a drain voltage Va of the PMOS transistor M21 is expressed by a formula (1) below.

$$Va = Vin - VLx \quad (1)$$

When the switching transistor M1 is off, the control signal S1 is at a high level. At this time, the PMOS transistor M22 is on while the PMOS transistor M23 is off. As a result, the same voltage as the input voltage Vin is inputted to the non-inverting input terminal of the operational amplifier circuit 21. Since the operational amplifier circuit 21 controls the PMOS transistor M21 to be turned off, the voltage Va as the drain voltage of the PMOS transistor M21 becomes 0 V.

Next, an operation of the slope voltage generating circuit 12 is described. In the slope voltage generating circuit 12, the NMOS transistor M24 is on during a period when the control signal S1 is at a high level. Therefore, a constant current i24 outputted by the constant current circuit 24 is bypassed by the NMOS transistor M24. The terminal voltage Vb of the ramp capacitor C21 is 0 V. However, since the resistor R25 causes a voltage drop, a voltage Vd of the non-inverting input terminal of the operational amplifier circuit 23 at this time is expressed by a formula (2) below when the resistor R25 has a resistance value of r25.

$$Vd = r25 \times i24 \quad (2)$$

When the control signal S1 is at a low level, the NMOS transistor M24 is turned off to be nonconductive. The ramp capacitor C21 is charged by an output current i24 of the constant current circuit 24. As a result, a terminal voltage Vb of the ramp capacitor C21 linearly rises to generate a ramp voltage. In this case, the voltage Vd of the non-inverting input terminal of the operational amplifier circuit 23 is expressed by a formula (3) below.

$$Vd = Vb + (r25 \times i24) \quad (3)$$

Since a source voltage of the NMOS transistor M25 equals to the voltage Vd, the slope voltage Vslp can be expressed by a formula (4) below when the resistors R23 and R24 have the same resistance values and the resistance value is sufficiently larger than output impedance of the voltages Va and Vd.

$$Vslp = (Va + Vd)/2 \quad (4)$$

The voltage Va is (Vin−VLx) as in the formula (1). The voltage Vd is {Vb+(r25×i24)} as in the formula (3). Therefore, the formula (4) is expressed by a formula (5) below.

$$Vslp = \{(Vin - Vlx) + Vb + (r25 \times i24)\}/2 \quad (5)$$
$$= (Vin - VLx + Vb)/2 + (r25 \times i24)/2$$

Figure 5:
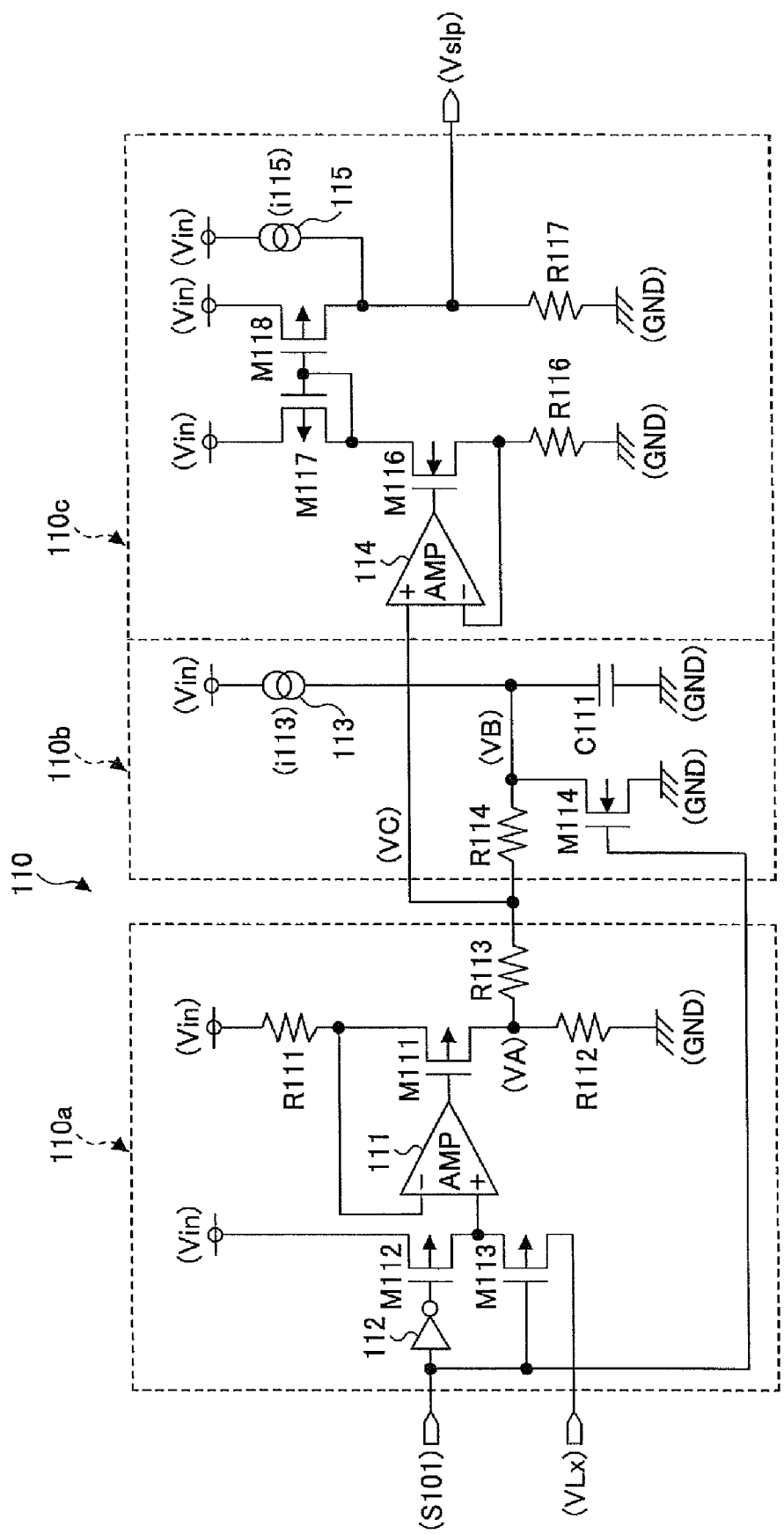
FIG. 5 is a diagram showing a circuit example of a slope voltage generating circuit in a conventional current mode control type switching regulator.
Figure 6:
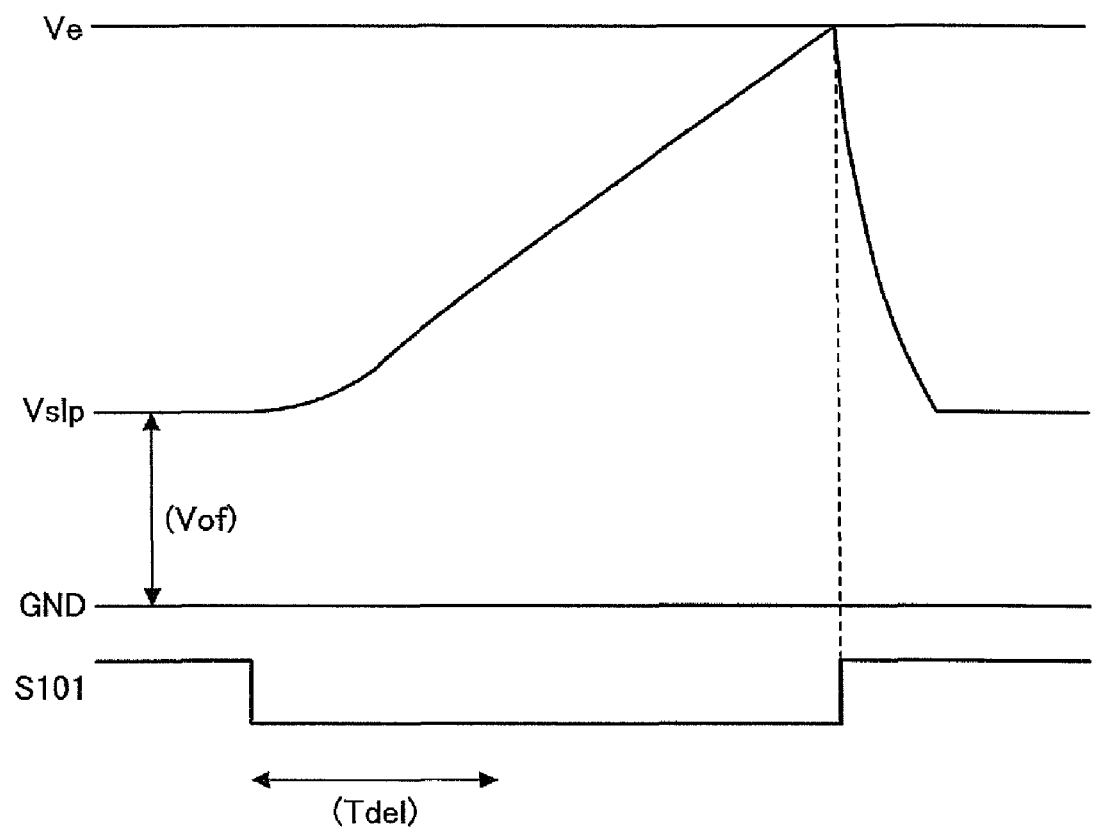
FIG. 6 is a diagram showing a waveform example of a slope voltage Vslp generated in a slope voltage generating circuit 110 of FIG. 5.

A second term of a right hand side in the formula (5), which is (r25×i24)/2, indicates an offset voltage Vof. That is, by setting the resistance value of the resistor R25 so that the second terms of the right hand sides of the formula (5) and the formula (c) become equal to each other, the slope voltage Vslp can be set the same as the slope voltage Vslp in the conventional circuit shown in FIG. 5.

Figure 4:
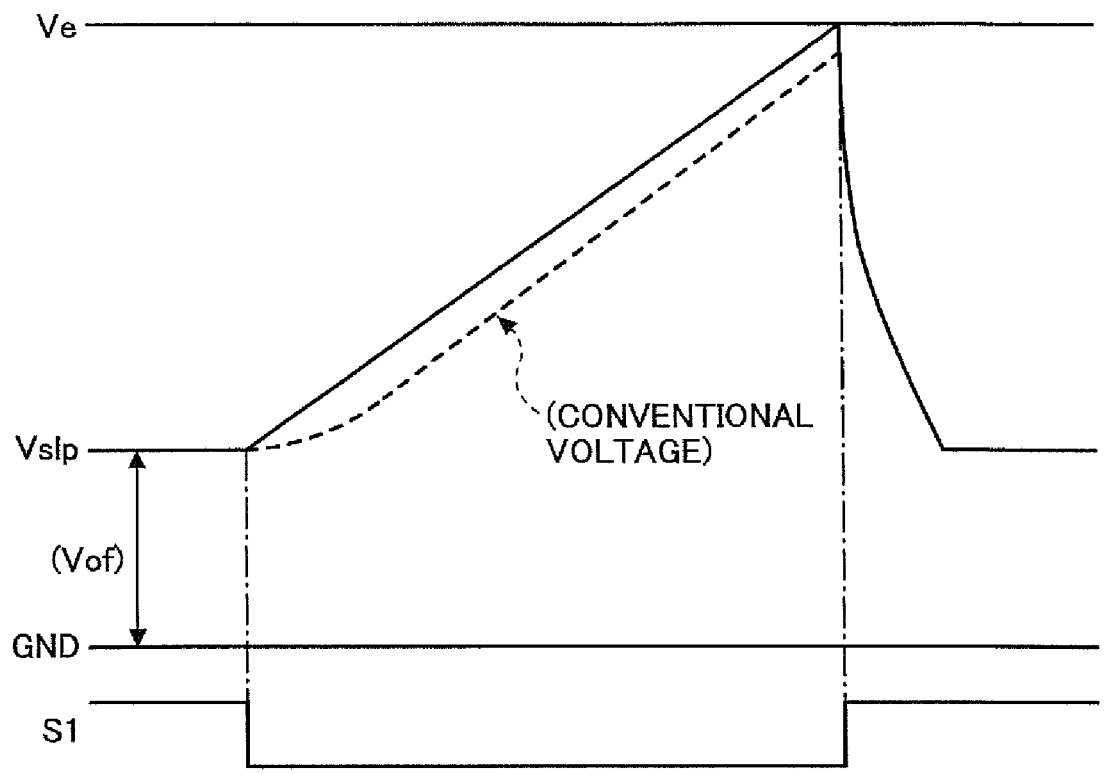
FIG. 4 is a diagram showing an enlarged waveform of a slope voltage Vslp of FIG. 2.

In this manner, in the current mode control type switching regulator of the first embodiment, a voltage-current converter circuit and a current mirror circuit that cause a delay in rising of the slope voltage Vslp are not necessary. Since the circuit configuration can be simplified, cost can be reduced. Further, as shown in FIG. 4, the slope voltage Vslp with favorable linearity can be generated right after the control signal S1 becomes a low level. Consequently, a stable operation can be performed even when an on-time of the switching transistor M1 is short.

Note that although the synchronous rectification step-down type switching regulator has been taken as an example in the first embodiment, the present invention is not limited to this. The present invention can be applied to a non-synchronous rectification step-down type switching regulator, and to synchronous rectification or non-synchronous rectification step-up type switching regulators as well. The present invention is applied to a current mode control type switching regulator having a slope voltage generating circuit.

According to one embodiment, an impedance converter circuit configured to perform impedance conversion on a ramp voltage and output the ramp voltage is provided in the ramp voltage generating circuit.

According to a current mode control type switching regulator of one embodiment of the present invention, a voltage-current converter circuit and a current mirror circuit that cause a delay in rising of a slope voltage can be omitted, and a slope voltage with favorable linearity can be generated right after a switching element is turned on to start energizing an inductor. As a result, a stable operation can be performed even when an on-time of the switching element is short.

The present application is based on Japanese Priority Application No. 2008-057414 filed on Mar. 7, 2008, with the Japanese Patent Office, the entire contents of which are hereby incorporated by reference.

The invention claimed is:

1. A current mode control type switching regulator for converting an input voltage into an output voltage that is a predetermined constant voltage, comprising:
   a switching element;
   an inductor energized by the input voltage in response to switching of the switching element;
   a rectifier element for discharging the inductor; and
   a slope voltage generating circuit unit configured to generate and output a slope voltage having an inclination responsive to a current flowing through the inductor,
   said current mode control type switching regulator being configured to amplify a voltage difference between a predetermined reference voltage and a divided voltage obtained by dividing the output voltage; compare the amplified voltage and the slope voltage to generate a pulsed signal having a duty cycle determined by the comparison; and control switching of the switching element in response to the pulsed signal, wherein the slope voltage generating circuit unit includes an inductor current detecting circuit for detecting a current flowing through the inductor when the switching element is on to energize the inductor and converting the detected current into a voltage; and a ramp voltage generating circuit for generating and outputting a ramp voltage having a predetermined inclination, said slope voltage generating circuit unit being configured to add the voltage obtained by the inductor current detecting circuit and the ramp voltage to generate the slope voltage; the ramp voltage generating circuit includes a constant current circuit for generating and outputting a predetermined constant current; an offset voltage generating resistor through which the constant current outputted by the constant current circuit flows; and a ramp capacitor charged by the constant current outputted by the constant current circuit through the offset voltage generating resistor, said ramp voltage generating circuit being configured to add a voltage drop caused by the offset voltage generating resistor to a terminal voltage of the ramp capacitor to generate and output the ramp voltage.

2. The current mode control type switching regulator as claimed in claim 1, wherein the ramp voltage generating circuit further includes an impedance converter circuit configured to perform impedance conversion on the ramp voltage and output the ramp voltage.

* * * * *